(12) United States Patent
Chambers et al.

(10) Patent No.: US 10,664,514 B2
(45) Date of Patent: May 26, 2020

(54) MEDIA SEARCH PROCESSING USING PARTIAL SCHEMAS

(71) Applicant: Zorroa Corporation, Berkeley, CA (US)

(72) Inventors: Matthew Chambers, Tewksbury, MA (US); Daniel Elliott Wexler, Soda Springs, CA (US)

(73) Assignee: Zorroa Corporation, Berkeley, CA (US)

( * ) Notice: Subject to any disclaimer, the term of this patent is extended or adjusted under 35 U.S.C. 154(b) by 492 days.

(21) Appl. No.: 15/697,336

(22) Filed: Sep. 6, 2017

(65) Prior Publication Data

US 2018/0067941 A1 Mar. 8, 2018

Related U.S. Application Data

(60) Provisional application No. 62/384,145, filed on Sep. 6, 2016.

(51) Int. Cl.
*G06F 16/48* (2019.01)
*G06F 16/21* (2019.01)
*G06F 16/901* (2019.01)

(52) U.S. Cl.
CPC ............ *G06F 16/48* (2019.01); *G06F 16/211* (2019.01); *G06F 16/9024* (2019.01)

(58) Field of Classification Search
None
See application file for complete search history.

(56) References Cited

U.S. PATENT DOCUMENTS

| 6,035,055 A | 3/2000 | Wang et al. |
| 2003/0009493 A1 | 1/2003 | Parker et al. |

(Continued)

FOREIGN PATENT DOCUMENTS

WO WO2012/030586 A1 3/2012

OTHER PUBLICATIONS

Buhler, Office Action, U.S. Appl. No. 15/232,769, dated Jul. 13, 2018, 14 pgs.

(Continued)

*Primary Examiner* — Christopher J Raab
(74) *Attorney, Agent, or Firm* — Morgan, Lewis & Bockius LLP

(57) ABSTRACT

A process generates searchable content for visual media files. The process uses partial schemas, including a source schema and a keyword schema. The process uses workers, each specifying its input schemas and its output schemas. A dependency graph includes a node for each worker, with dependencies based on the input and output schemas. The graph includes initial workers that correspond to distinct media types, which use the source schema. The process constructs a source schema instance for each selected media file, and the process traverses nodes in the graph beginning with an initial worker process according to the media type. This begins execution of multiple workers, which construct additional schema instances. Some workers extract keywords from the source file and insert the terms into the keyword schema instance. The process stores the keyword schema instance and a link to the corresponding file in a database for subsequent media queries.

20 Claims, 12 Drawing Sheets

(56) References Cited

U.S. PATENT DOCUMENTS

| | | | |
|---|---|---|---|
| 2003/0236752 A1 | 12/2003 | Dawson et al. | |
| 2004/0070678 A1 | 4/2004 | Toyama et al. | |
| 2005/0154754 A1 | 7/2005 | Sheldon et al. | |
| 2005/0160079 A1 | 7/2005 | Turski et al. | |
| 2007/0203922 A1* | 8/2007 | Thomas | G06F 16/258 |
| 2007/0273702 A1 | 11/2007 | Ishii | |
| 2008/0228799 A1* | 9/2008 | Fagin | G06F 40/154 |
| 2008/0281820 A1* | 11/2008 | Do | G06F 16/214 |
| 2008/0304808 A1 | 12/2008 | Newell et al. | |
| 2009/0009493 A1 | 1/2009 | Hong | |
| 2009/0106271 A1 | 4/2009 | Chieu et al. | |
| 2009/0157638 A1 | 6/2009 | Flynn et al. | |
| 2009/0164946 A1 | 6/2009 | Liddington | |
| 2009/0203368 A1 | 8/2009 | Marsyla et al. | |
| 2009/0208116 A1 | 8/2009 | Gokturk et al. | |
| 2010/0076947 A1* | 3/2010 | Kurapat | G06F 16/951 707/706 |
| 2010/0094807 A1 | 4/2010 | Farlee et al. | |
| 2011/0022394 A1 | 1/2011 | Wide | |
| 2011/0047163 A1 | 2/2011 | Chechik | |
| 2011/0145232 A1 | 6/2011 | Chang et al. | |
| 2012/0304247 A1 | 11/2012 | Badger et al. | |
| 2015/0016700 A1 | 1/2015 | Drozdzal et al. | |
| 2015/0296228 A1 | 10/2015 | Chen et al. | |
| 2015/0347505 A1 | 12/2015 | Ohashi et al. | |
| 2016/0065547 A1 | 3/2016 | Heinrich | |
| 2016/0140146 A1* | 5/2016 | Wexler | G06K 9/18 707/741 |
| 2016/0253625 A1* | 9/2016 | Casey | G06Q 10/103 717/101 |

OTHER PUBLICATIONS

Buhler, Final Office Action, U.S. Appl. No. 15/232,769, dated Nov. 29, 2017, 17 pgs.

Buhler, Notice of Allowance, U.S. Appl. No. 15/232,769, dated Feb. 26, 2016, 14 pgs.

"List all files in all subfolders," Retrieved from https://superuser.com/questions/32771/list-all-files-in-all-subfolders/1256324.

Tang, "Exploring Video Streams Using Slit-Tear Visualization," Tang et al, 2008, from: http://grouplab.cpsc.ucalgary.ca/grouplab/uploads/Publications/Publications/2008-SlitTear.AVI.pdf.

Zorroa Corporation, International Search Report and Written Opinion, PCT/US2015/060922, dated Mar. 9, 2016, 9 pgs.

Zorroa Corporation, International Preliminary Report on Patentability, PST/US2015/060922, dated May 16, 2017, 6 pgs.

Wexler, Office Action, U.S. Appl. No. 14/941,502, dated May 4, 2018, 17 pgs.

Wexler, Final Office Action, U.S. Appl. No. 14/941,502, dated Dec. 7, 2018, 15 pgs.

Wexler, Notice of Allowance, U.S. Appl. No. 14/941,502, dated Mar. 6, 2019, 19 pgs.

Wexler, Office Action, U.S. Appl. No. 15/232,759, dated May 17, 2018, 12 pgs.

Wexler, Final Office Action, U.S. Appl. No. 15/232,759, dated Nov. 8, 2018, 15 pgs.

Wexler, Office Action, U.S. Appl. No. 15/232,759, dated Mar. 5, 2019, 12 pgs.

Wexler, Notice of Allowance, U.S. Appl. No. 15/232,759, dated Jun. 19, 2019, 5 pgs.

* cited by examiner

Source partial schema 600

| Field Name | Data Type | Description |
|---|---|---|
| type | string | URI media type, e.g. `image/jpeg`, `video/mp4`, `application/pdf`. |
| path | string | URL reference to the source document. |
| extension | string | 3 or 4 letter extension of the source document file. e.g. `jpg`. |
| filename | string | Basename and extension of the source document file. Last path component of the source document path, e.g. `foo.jpg`. |
| basename | string | Last path component of the source document without extension, e.g. `foo`. |
| directory | string | Path to the directory containing the source document file. e.g. `/bim/bam/boom`. |
| checksum | string | SHA-1 or similar hash of the source document contents for similarity operations. |

Figure 6A

Document partial schema 602

| Field Name | Data Type | Description |
|---|---|---|
| title | string | Document title |
| author | string | Author's full name |
| body | string | Full or partial document body text |
| pages | integer | Number of pages in the document |
| images | List<ImageSchema> | Embedded images, in order |
| videos | List<VideoSchema> | Embedded videos, in order. |

Figure 6B

Image partial schema 604

| Field Name | Data Type | Description |
|---|---|---|
| width | integer | Width of the image in pixels |
| height | integer | Height of the image in pixels |

Figure 6C

Video partial schema 606

| Field Name | Data Type | Description |
|---|---|---|
| width | integer | Width of the video in pixels |
| height | integer | Height of the video in pixels |
| audioSampleRate | integer | Samples per second for the audio stream. |
| sampleRate | integer | Samples per second for each line in the video frame. |
| duration | double | Length of the video in seconds |
| aspectRatio | double | Format of the video = width/height |
| frames | integer | Total number of frames in the video |
| audioChannels | integer | Number of audio channels |
| format | string | Video file format, e.g. "mp4" |
| frameRate | double | Number of frames per second |
| processRate | double | Number of video frames per second to extract as images for processing by image processors. Default = 0 implies no processing. |

Figure 6D

Proxy partial schema 608

| Field Name | Data Type | Description |
|---|---|---|
| url | string | Streamable source file |
| width | integer | Width of this proxy's images |
| height | integer | Height of this proxy's images |
| type | string | URI media type. e.g. image/jpeg |
| image | image | In-memory representation of this proxy |

Figure 6E

Location partial schema 610

| Field Name | Data Type | Description |
|---|---|---|
| gps | Point2D | Latitude and longitude |
| elevation | double | Kilometers above sea level |
| city | string | Name of city |
| state | string | State, or similar entity |
| country | string | Country name |
| continent | string | Continent name |

Figure 6F

Note partial schema 612

| Field Name | Data Type | Description |
|---|---|---|
| user | integer | UUID of the user who created the note |
| time | date | Time the note was created |
| note | string | Text of the note |
| text | List<(string,color,point2D)> | List of text notations and their associated position |
| points | List<(color,point2D)> | Annotation points, typically rendered as discs or sprites. |
| lines | List<(color,double,List<point2D>)> | Annotation lines with an associated color and width for each line. |
| polygons | List<(color,List<point2D>)> | Annotation polygons with an associated fill color for each. |
| lineInterp | string | Interpolation method for all lines, e.g. "linear", "bezier". |

Figure 6G

MEDIA SEARCH PROCESSING USING PARTIAL SCHEMAS

CROSS REFERENCE TO RELATED APPLICATIONS

This application claims priority to U.S. Provisional Application Ser. No. 62/384,145, filed Sep. 6, 2016, entitled "Media Search Processing Using Partial Schemas," which is incorporated by reference herein in its entirety.

This application is related to U.S. patent application Ser. No. 14/941,502, filed Nov. 13, 2015, entitled "Systems and Methods of Building and Using an Image Catalog," which is incorporated herein by reference in its entirety.

TECHNICAL FIELD

The disclosed implementations relate generally to searching a document repository and more specifically to a processing methodology for constructing searchable content for visual media files.

BACKGROUND

Collections of visual media files (e.g., images and video) are growing in size and are often in multiple locations. Media repositories may exist on local storage for mobile and desktop devices, dedicated network-attached storage (NAS), or on remote cloud services. It is particularly difficult to search media files. Whereas textual queries can be matched to text content of ordinary documents, an image or video does not include text that can be directly matched. In addition, because of the vast quantity of media files, a manual scan of the media file universe is generally not productive. Furthermore, brute force approaches, such as performing OCR on an entire image, does not necessarily capture critical characteristics that would be relevant to a search query.

SUMMARY

Disclosed implementations address the above deficiencies and other problems associated with managing media files. The present disclosure is directed towards processes that provide visual insight, discovery, and navigation into collections of millions of media files. A user can search across an entire portfolio using textual queries, which are matched against semantic information extracted from the media files.

Disclosed implementations generate searchable content using groups of interrelated worker processes, which can be customized for particular scenarios. For example, the worker processes applied to a set of landscape images may be quite different from the worker processes applied to an animated movie. Each worker process specifies a set of partial schemas that it needs as input and specifies a set of partial schemas that it creates. Each partial schema contains a specific group of data fields, each with a specified data type. Each partial schema instance includes data for a specific media file. In some cases, not all of the data fields have data for every media file. The input and output schemas for each worker process impose a partial ordering on the worker processes. One of the output schema instances includes a set of keywords for the processed media file. One partial schema that is used at the outset of the process is a source schema, which includes basic information about the source file being processed.

The source and keywords schemas are just two of many partial schemas provided in media processing implementations. In addition, users can create new worker processes and new partial schemas, and define which partial schemas each worker process creates or uses. Some implementations enable users to extend existing schemas (e.g., adding additional data fields). Some implementations provide the extensibility through an SDK for developers.

Each partial schema is roughly "a set of named and typed data fields providing a logical grouping of a semantic concept." These partial schemas provide the formal inputs and outputs to each processing node. Some of the partial schemas are internal to a processing network. These are used to coordinate processing among a set of nodes. Defining a schema allows nodes and clients of the framework to be developed independently, which facilitates modular development and scaling. Some of the partial schemas are defined by the inputs to the system (e.g., images, videos, and PDFs) and are stored as the outputs in a database (e.g., keywords, automatically computed document categories, Boolean values determined through vision analysis, and so on).

For example, some implementations define an image schema to include: a width, a height, a color type, and a precision. Processing nodes that work with images can use this definition to perform their work. The worker processes for the nodes can be developed independently, and can rely on this definition to coordinate their work. Similarly, client applications can be written that rely on the aspect ratio to display the image.

A more traditional database has a single monolithic schema. In contrast, implementations here utilize a flexible and extensible collection of partial schemas that can be combined differently for each media file collection. This allows considerable reuse of processing components, and enables third parties to develop their own processing nodes for their clients that interoperate with the rest of the platform.

On the other end of the spectrum, a no-SQL database has no schema at all, just a flat set of named fields. In this "Wild West" environment, a developer can do anything, but such a system does not scale or provide a foundation for modular development.

In some implementations, some of the worker processes apply computer vision algorithms to media files (e.g., images) in order to extract metadata. The computer vision algorithms include: deep convolutional neural networks to extract keywords; optical character recognition to extract text (e.g., jersey numbers, signs, and logos); facial recognition to match faces to names; color analysis; and structural analysis (e.g., using SIFT). In addition, some worker processes extract existing metadata for each media file, such as its origin, creation date, author, location, camera type, and statistical information.

The partial schemas enable modular development because each worker process defines which schemas it needs and which schemas it creates. In addition, by saving the partial schemas, some implementations enable efficient reprocessing. For example, one worker process (of many) may be modified without changing the others. The modified worker process can begin by using the saved schemas that it needs, and only subsequent worker processes that rely on the output of the modified worker process (either directly or indirectly) need to be reprocessed.

In accordance with some implementations, a method generates searchable content for visual media files. The method is performed at a computing system having one or more processors and memory. The method defines a set of schemas. The schemas are sometimes referred to as "partial schemas" and each schema includes a respective plurality of related data fields, each having a specified data type. The set of schemas includes a source schema, which includes basic information about a source media file, and a keyword schema, which is filled in during processing to include keywords relevant to the media file. The set of schemas typically includes many partial schemas in addition to the source and keyword schemas, as illustrated below in FIGS. 6A-6H.

The method defines worker processes, where each worker process definition specifies a respective set of one or more input schemas from the defined set of schemas and each worker process definition specifies a respective set of one or more output schemas from the defined set of schemas. The method builds a dependency graph (also called a process flow graph) that includes a node for each worker process, with dependencies based on the input schemas and output schemas for each worker process. The dependency graph includes multiple initial worker processes, and each initial worker process corresponds to a distinct media type. The respective set of input schemas for each initial worker process consists of the source schema.

The method receives selection of a plurality of visual media files and constructs a respective source schema instance for each of the selected visual media files, filling in fields in the source schema instance using information about the respective visual media file. For each selected visual media file, the method traverses nodes in the dependency graph beginning with a respective initial worker process corresponding to a media type of the visual media file, thereby executing a plurality of worker processes, which construct a plurality of additional distinct schema instances. One or more of the worker processes executed during the traversal inserts search terms into a respective keyword schema instance. The method stores data from the keyword schema instance and a link to the corresponding visual media file in a database for subsequent searching of visual media files.

In some implementations, partial schemas provide a way of communicating data between the nodes in the graph. Some of the partial schemas are used during processing and discarded, but other schemas are stored in a database (e.g., for subsequent searching and/or reprocessing). For example, one node may compute boxes that surround regions that may include text. Data for these boxes is placed in a partial schema for subsequent worker processes that perform OCR on the content of the boxes. Although these boxes do not include keywords, some implementations saved the partial schemas for the boxes for reprocessing. In some implementations, the box information is discarded after processing is complete. Similarly, the OCR text from a processing node may be stored permanently in the database, or stored only temporarily in a partial schema, enabling other worker processes to analyze the OCR text (e.g., another worker process may identify keywords in the scanned text). In this example, the partial schema with the keywords is stored (for subsequent searching), but the partial schemas for the boxes and OCR text may be saved or discarded depending on the implementation (e.g., based on complexity or usefulness for reprocessing).

In some implementations, the method receives a search query from a user, where the search query includes multiple textual terms. The method matches the received search query to one or more keyword schema instances. The method then returns, to the user, search results that identify visual media files corresponding to the matched keyword schema instances.

In some implementations, the method stores additional schema instances in the database. In some implementations, the method stores data for all of the schema instances that are created during traversal of the graph. In some implementations, the method stores data for a plurality of the additional schema instances. In some implementations, a user can designate which of the schema instances are stored.

In some implementations, the method receives a search query from a user, where the search query includes one or more textual terms. The method matches the received search query to one or more of the stored schema instances. The method then returns search results to the user. The search results identify visual media files corresponding to the matched schema instances.

In some implementations, the method includes a recursive loop, which extracts embedded media files from an existing file, and adds the extracted files to the set of media files for processing. For example, while processing a PDF file or other multipage document, a worker process may identify embedded image or video files. In some implementations, traversing nodes in the dependency graph for a first visual media file includes executing a first worker process that extracts one or more additional visual media files from within the first visual media file and adds the additional visual media files to the selected visual media files.

In some implementations, a worker process extracts full pages from within a PDF or other multipage document, converts each page to an image, and submits them through an image processing pipeline for analysis. This can be particularly useful for scanned documents. The disclosed processes can identify both text and embedded images, and create searchable text for the scanned pages.

In some instances, the media files include one or more image files (e.g., JPEG, PNG, or TIFF), one or more video files (MP4, MOV, or AVI), and/or one or more multipage documents (such as PDF documents or other documents that contain embedded images or video).

BRIEF DESCRIPTION OF THE DRAWINGS

FIGS. 6A-6G are skeletal partial schemas that are used for generating searchable content, in accordance with some implementations.

Like reference numerals refer to corresponding parts throughout the drawings.

DESCRIPTION OF IMPLEMENTATIONS

Reference will now be made to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
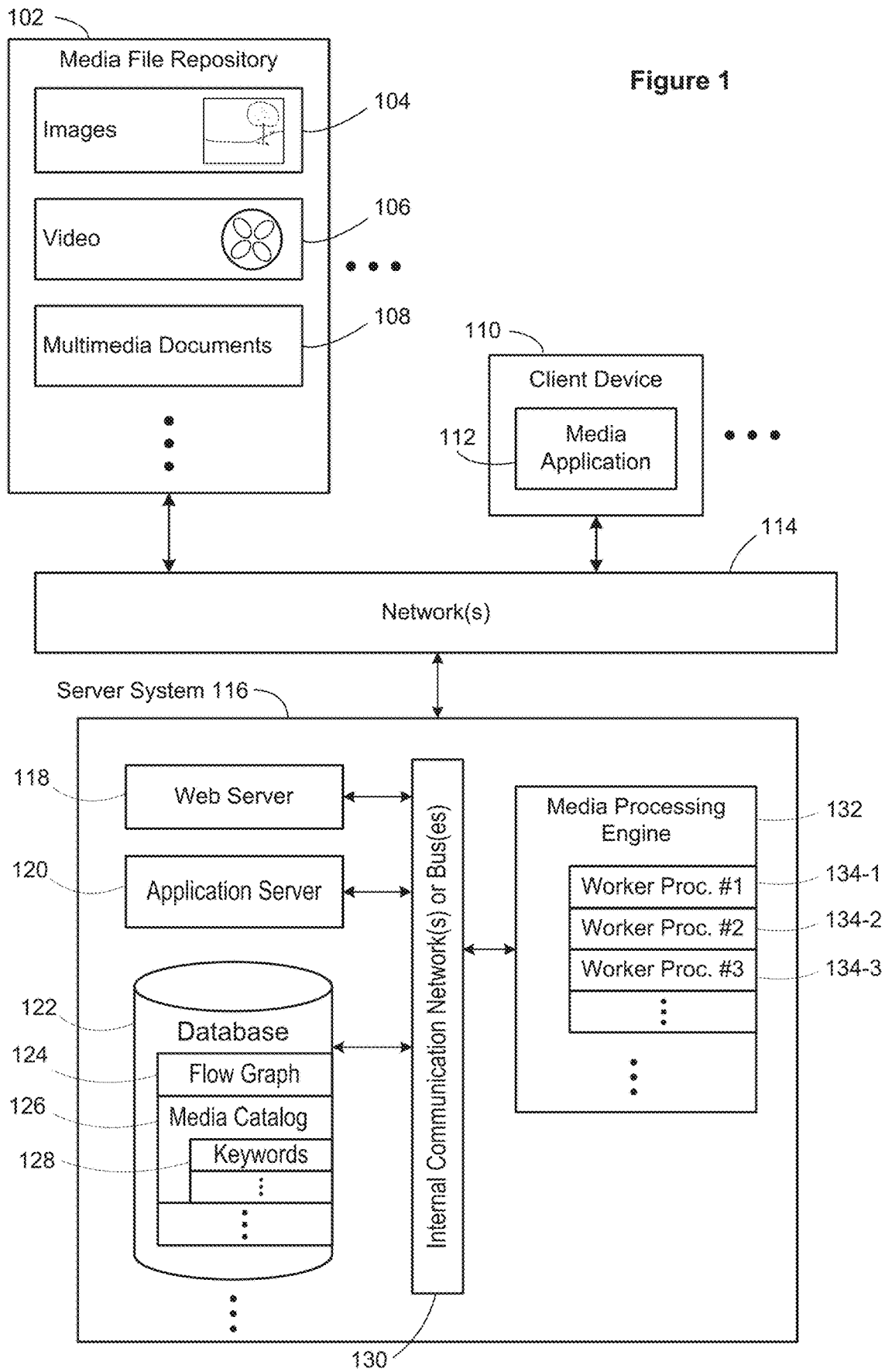
FIG. 1 is a block diagram of a context in which some implementations operate.

FIG. 1 illustrates a context in which some implementations operate. A media file repository 102 stores images 104, videos 106, and/or multimedia documents (e.g., PDF) 108. In some implementations, there are two or more media file repositories 102. A typical media file repository 102 may store millions of media files or more. In some implementations, the media files include images (e.g., JPEG, TIFF, PNG, GIF, BMP, CGM, or SVG). In some implementations, the media files include videos or sound recordings. In some implementations, all of the media files in the repository 102 have the same type, but some repositories 102 include a heterogeneous collection of multimedia files.

In the illustrated implementation, there is a server system 116, which includes one or more servers 300. In some implementations, the server system 116 consists of a single server 300. More commonly, the server system 116 includes a plurality of servers 300 (e.g., 20, 50, 100, or more). In some implementations, the servers 300 are connected by an internal communication network or bus 130. The server system 116 includes one or more web servers 118, which receive requests from users (e.g., from a client device 110) and return appropriate information, resources, links, and so on. In some implementations, the server system 116 includes one or more application servers 120, which provide various applications, such as a media application 112. The server system 116 typically includes one or more databases 122, which store information such as web pages, a user list, and various user information (e.g., user names and encrypted passwords, user preferences, and so on). The database here stores a process flow graph 124, as described below with respect to FIGS. 5A and 5B. The database also stores a media catalog 126, which includes information about media files that have been imported. The media catalog 126 is described in more detail below with respect to FIG. 4. The media catalog 126 stores data about each imported media file, including a set of keywords 128. Typically, the keywords are populated during import, using the techniques described in the present application.

The server system 116 also includes a media processing engine 132, which is sometimes referred to as an import engine. Note that the media processing engine 132 is not limited to the import process. For example, a user may create additional processing logic after media files are already imported. The media processing engine 132 can be reapplied, using the updated logic, to generate updated search terms for media files that are already in the media catalog 126. The media processing engine 132 uses multiple worker process 134-1, 134-2, 134-3, . . . to analyze each media file and generate the searchable content. As illustrated below in FIGS. 5A and 5B, each worker process corresponds to a node in the process flow graph 124. In some implementations, each worker process 134 corresponds to a unique object class or executable program.

The media file repositories 102, client devices 110, and the server system 116 are connected by one or more networks 114, such as the Internet and one or more local area networks.

In some implementations, some of the functionality described with respect to the server system 116 is performed by a client device 110.

Figure 2:
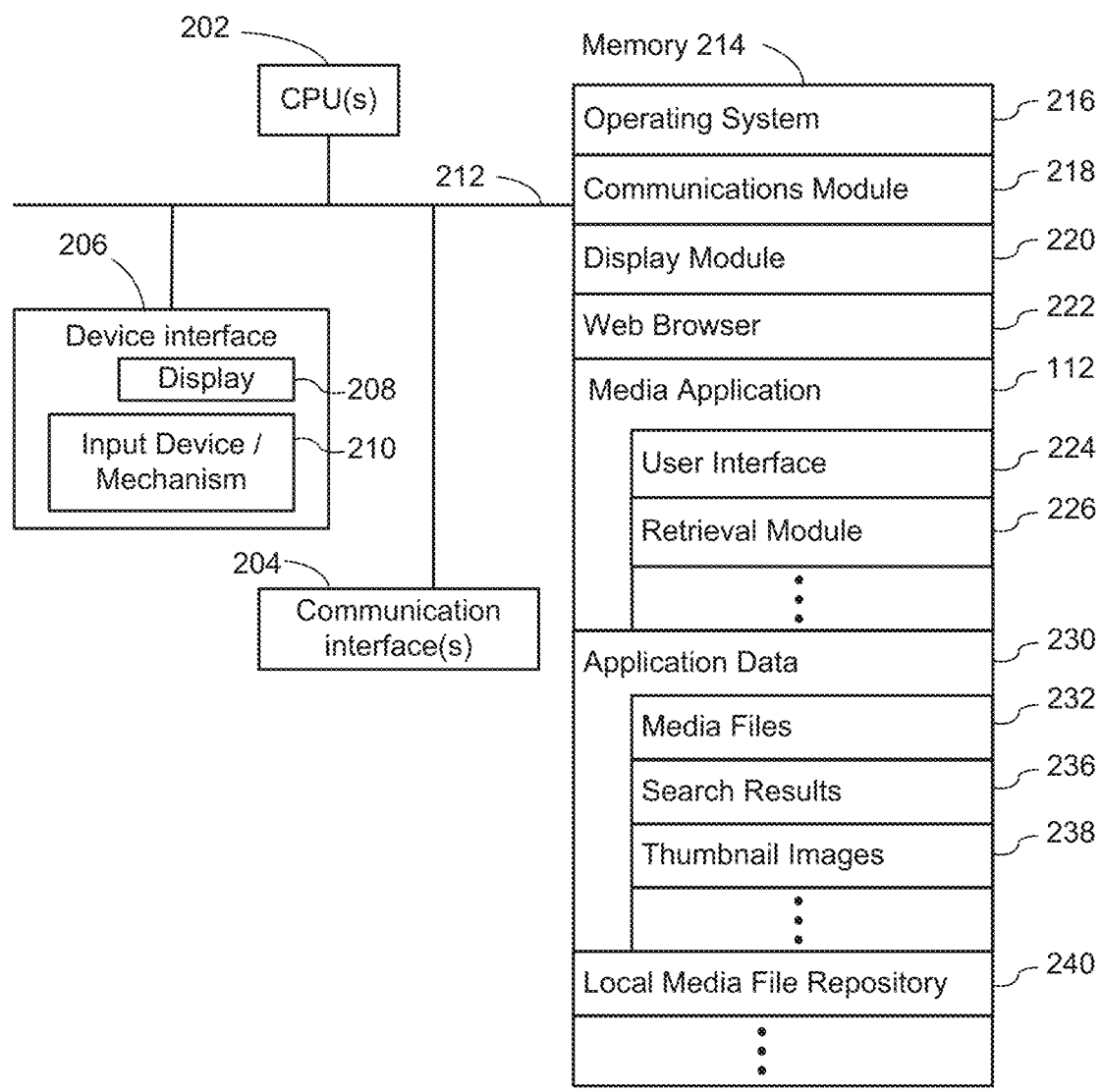
FIG. 2 is a block diagram of a client device in accordance with some implementations.

FIG. 2 is a block diagram illustrating a client device 110 that a user uses to access a media application 112. A client device is also referred to as a computing device, which may be a tablet computer, a laptop computer, a smart phone, a desktop computer, a PDA, or other computing device than can run the media application 112 and has access to a communication network 114. A client device 110 typically includes one or more processing units (CPUs) 202 for executing modules, programs, or instructions stored in the memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 110 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the client device 110 to other computers and devices via the one or more communication network interfaces 204 (wired or wireless) and one or more communication networks 114, such as the Internet, other wide area networks, local area networks, metropolitan area networks, and so on;
- a display module 220, which receives input from the one or more input devices 210, and generates user interface elements for display on the display device 208;
- a web browser 222, which enables a user to communicate over a network 114 (such as the Internet) with remote computers or devices;

a media application 112, which enables a user to search and retrieve documents from one or more remote document repositories 102 or local document repository 240. The media application 112 provides a user interface 224, as illustrated below by the screenshot in FIG. 7. The media application 112 also includes a retrieval module 226, which retrieves media files (or thumbnails) corresponding to a search query or search folder;

application data 230, which includes a set of search results 236, and may include thumbnail images 238 for each one of the identified media files in the search results. In some instances, the user retrieves one or more full media files 232 based on the search results 236; and in some implementations, the memory stores a local media file repository 240, such as a personal photo album or artwork portfolio.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a client device 110, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
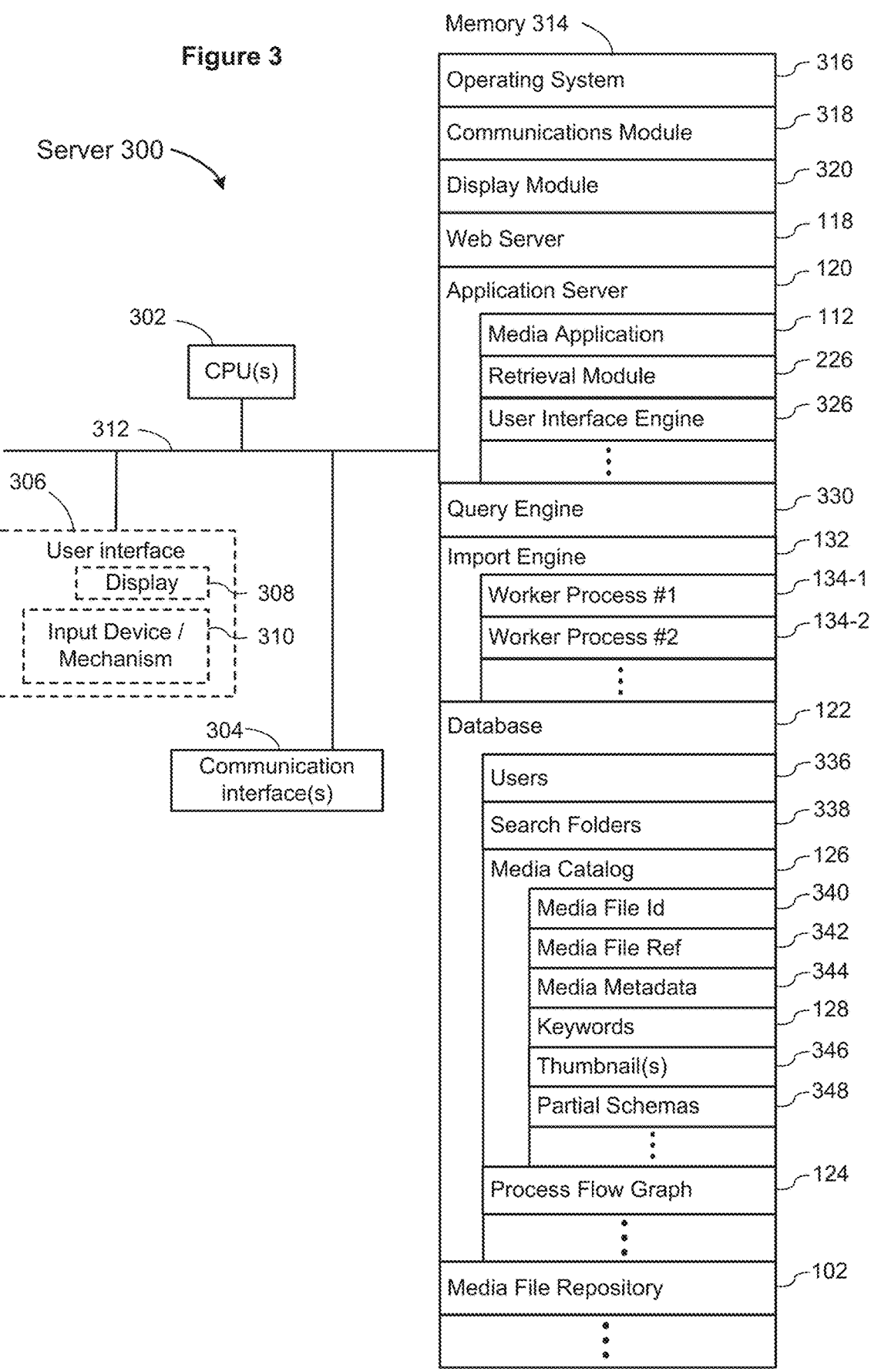
FIG. 3 is a block diagram of a server in accordance with some implementations.

FIG. 3 is a block diagram illustrating a server 300. In some implementations, a server 300 is one of a plurality of servers in a server system 116. A server 300 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 300 includes a user interface 306, which may include a display device 308 and one or more input devices 310, such as a keyboard and a mouse.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, comprises a non-transitory computer readable storage medium. In some implementations, the memory 314, or the computer readable storage medium of the memory 314, stores the following programs, modules, and data structures, or a subset thereof:

an operating system 316, which includes procedures for handling various basic system services and for performing hardware dependent tasks;

a communications module 318, which is used for connecting the server 300 to other computers via the one or more communication network interfaces 304 (wired or wireless) and one or more communication networks 114, such as the Internet, other wide area networks, local area networks, metropolitan area networks, and so on;

a display module 320, which receives input from one or more input devices 310, and generates user interface elements for display on a display device 308;

one or more web servers 118, which receive requests from a client device 110, and return responsive web pages, resources, or links. In some implementations, each request is logged in the database 122;

one or more application servers 120, which provide various applications (such as a media application 112) to the client devices 110. In some instances, applications are provided as a set of web pages, which are delivered to the client devices 110 and displayed in a web browser 222. The web pages are delivered as needed or requested. In some instances, an application is delivered to a client device 110 as a download, which is installed and run from the client device 110 outside of a web browser 222;

in some implementations, the application server provides a retrieval module 226 as part of the media application 112. In other implementations, the retrieval module 226 is a separate application provided by the application server 120. The retrieval module retrieves media files (or thumbnails) corresponding to a search query or search folder;

some implementations include a user interface engine 326, which provides the user interface 224 for users of the media application 112;

a query engine 330, which is used to identify media files corresponding to a user's textual search queries, and return responsive search results;

an import engine (also known as a media processing engine) 132, which processes media files to generate searchable content, and described in more detail below with respect to FIGS. 5A-5D. The import engine uses a plurality of worker processes 134-1, 134-2, . . . to generate the searchable content. Each of the worker processes 134 corresponds to a node in the process flow graph 124;

one or more databases 122, which store various data used by the modules or programs identified above. In some implementations, the database 122 includes a list of authorized users 336, which may include user names, encrypted passwords, and other relevant information about each user. In some implementations, the database 122 also stores search folder definitions 338, which specify what media files are associated with user-created folders;

the database 122 also stores a media catalog 126, which identifies a list of media files that have been imported. Each media file in the catalog has an associated media file id 340 (e.g., a globally unique identifier), and a media file reference 342, which is a link or address of the media file (e.g., a URL or network address). Note that implementations typically do not save new copies of the media file during the import process, so the media files remain in their original locations. The data for each media file also includes various metadata 344

(e.g., author, creation timestamp, creation location, and so on). When the media processing engine 132 runs (or reruns), the process creates or updates the set of keywords 128 for the media file. In some implementations, the media catalog 126 stores one or more thumbnails 346 for each media file. In some implementations, the media catalog 126 also stores that partial schemas 348 that are generated during the import processing. In some implementations, only a specified subset of the partial schemas are saved. The saved partial schemas may be used in subsequent searching of the media catalog;

the database also stores the process flow graph 124, which is used by the worker processes 134. In particular, the process flow graph includes the nodes 500, as illustrated below in FIGS. 5A and 5B, as well as the dependencies between the nodes; and zero or more media file repositories 102, which contain the actual media files (e.g., images and videos).

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 illustrates a server 300, FIG. 3 is intended more as a functional illustration of the various features that may be present in a set of one or more servers (the server system 116) rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

As illustrated in FIGS. 2 and 3, the functionality for a media application may be shared between a client device 110 and a server system 116. In other implementations, the majority of the processing and data storage occurs at the server system 116, and the client device 110 uses a web browser 222 to view and interact with the data. One of skill in the art recognizes that various allocations of functionality between the client device 110 and the server system 116 are possible, and some implementations support multiple configurations (e.g., based on user selection).

Figure 4:
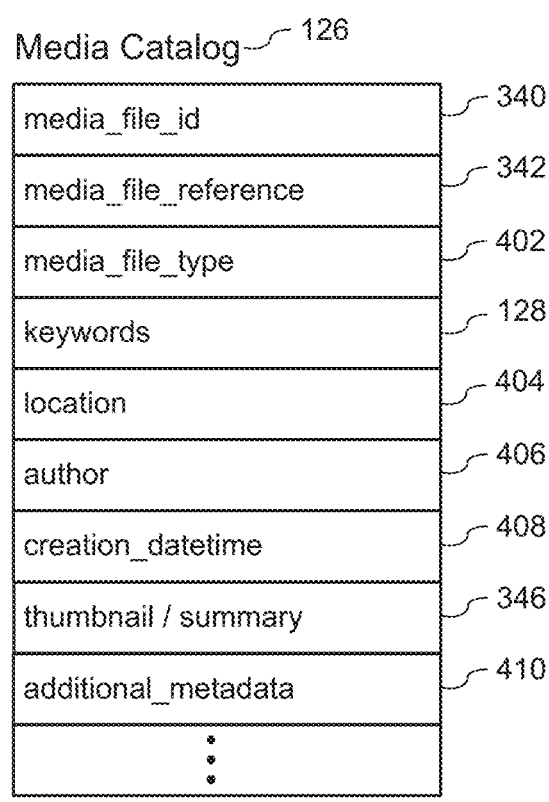
FIG. 4 provides is a skeletal data structure for storing a media catalog in accordance with some implementations.

FIG. 4 shows a skeletal media catalog 126. Each record in the media catalog 126 identifies a media file in one of the media file repositories 102. Each media file is uniquely identified by a media file ID 340, and includes a media file reference 342 to identify the source location of the document. For example, the media file reference may specify a full path name, including server, volume, path, and file name for a document stored on a local area network, or a URL with a file name for documents retrieved over the Internet. Some implementations store a media file type 402 for each media file. In some implementations, the media file type 402 corresponds to the file name extension of the media file, such as "PDF", "JPEG", "TIFF", "PNG", "BMP", "TXT", "MP4", and so on. In some implementations, the media file type specifies a general category for each document, such as "VIDEO", "IMAGE", or "DOCUMENT".

In some implementations, the media catalog 126 includes a list of keywords 128 for each document. In some implementations, the keywords are indexed.

In some instances, location information is available for the documents, which identifies where the document was created. For example, when the documents are images, GPS coordinates may be available for some of the images, and these coordinates are stored as a location 404 for the media file.

In some implementations, other metadata 344 is stored for each document, such as an author 406 and/or a creation datetime 408, or additional metadata 410.

In some implementations, the media catalog 126 also includes one or more thumbnail images or document summaries 346. For images, this is typically a small low-resolution copy of the image that can be used for reviewing many images at the same time. For textual documents, some implementations generate a summary or abstract of the document, such as a title and some key sentences. For videos, a thumbnail image may be a low resolution image of one or more video frames.

The media catalog 126 is typically populated by the import engine 132 during an import process. The user specifies various parameters for an import operation, such as a location of the repository, a directory of files in the repository, an optional filter of which documents to select, and so on. In some instances, the user specifies which custom fields to populate during the import process. Some of the techniques used for extracting information during the import process are described in application Ser. No. 14/941, 502, filed Nov. 13, 2015, entitled "Systems and Methods of Building and Using an Image Catalog," which is incorporated herein by reference in its entirety.

Figures 5A, 5B:
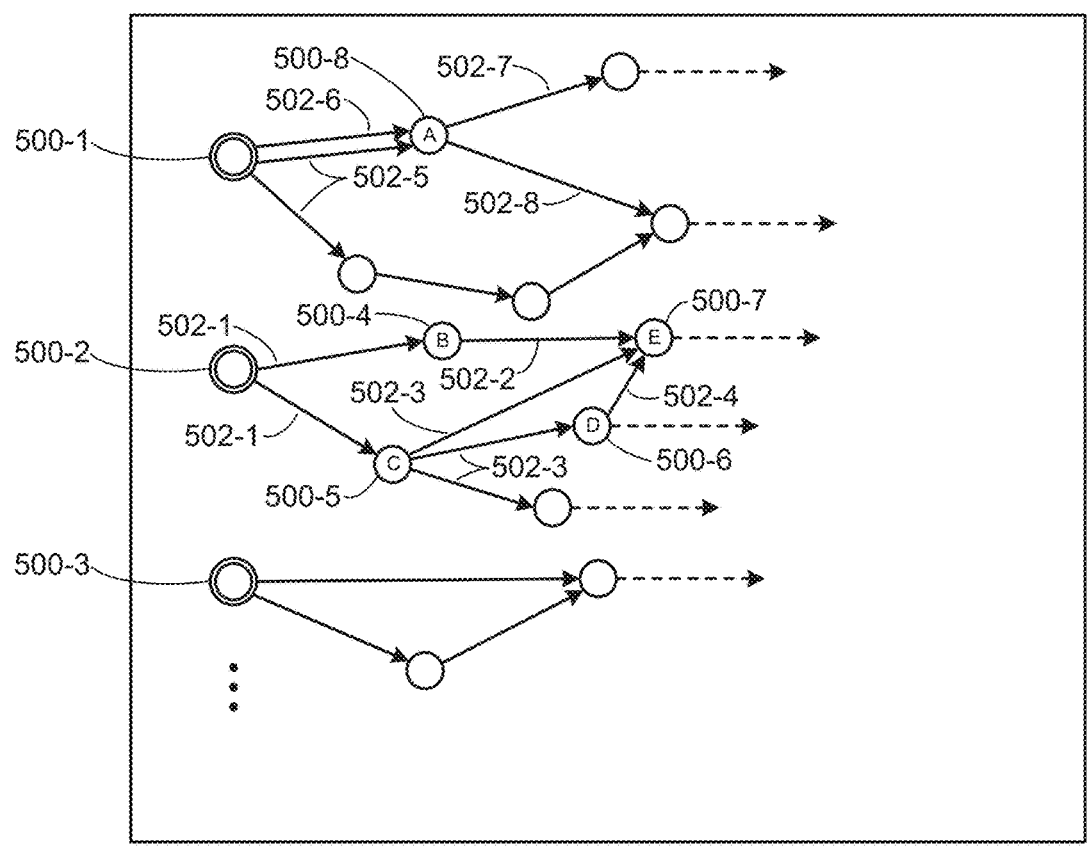
FIG. 5A shows a process flow graph used in the process for generating searchable content in accordance with some implementations.
FIG. 5B provides a skeletal data structure for the nodes in the data flow graph of FIG. 5A, in accordance with some implementations.

FIG. 5A provides a process flow graph 124, which is used by the media processing engine 132 to generate searchable content from media files. Each of the nodes 500 in the graph 124 corresponds to a specific worker process 518, as illustrated in FIG. 5B. In the illustrated graph 124, there are three initial nodes 500-1, 500-2, and 500-3. Each initial node corresponds to a unique media type 402. For example, the first initial node 500-1 may correspond to image files, the second initial node 500-2 may correspond to video files, and the third initial node 500-3 may correspond to PDF files. In some implementations, the media file types 402 are more granular. For example, there may be a separate initial node for each image type or sub-group of image types (e.g., separate initial nodes for JPEG versus PNG files). Initial nodes rely only on a source partial schema 600, which is illustrated below in FIG. 6A. In the node data structure, implementations may designate whether each node is an initial node using the field is_initial_node 512. For each initial node, the node also specifies the media_file_type 402 (which may be empty or null for non-initial nodes).

In some implementations, each node has a unique node_id 510, which may be a globally unique identifier. An important part of each node is the specification of input schemas 514 and output schemas 516. The input schemas 514 identify what partial schemas are required to be populated before the worker process 518 for the node can run. For example, the initial nodes 500-1, 500-2, and 500-3 specify only the source partial schema 600 as the input schemas 514. Generally, each node 500 generates one or more output schemas 516 as well, and these outputs can be used as inputs for the worker processes corresponding to other nodes. In some implementations, each node can also specify one or more parameters 520, which is used by the node's worker process 518 to specify how it runs (e.g., parameters used by a computer vision algorithm).

Because each node 500 specifies both inputs and outputs, it creates natural dependencies in the process flow graph 124. Because of this, a process flow graph 124 is also called a dependency graph. Each arrow in the process flow graph corresponds to a specific partial schema that is created by the node at the tail of the arrow and is used ("consumed") by the node at the head of the arrow. As illustrated in FIG. 5A, a single node can have multiple input schemas and/or multiple output schemas. For example, node A 500-8 has two input schemas 502-5 and 502-6 and node A 500-8 also has two output schemas 502-7 and 502-8. Not all partial schemas are used by a subsequent node (e.g., the keyword partial schema), and thus do not appear in the process flow graph 124 because they do not create dependencies.

In the illustrated process flow graph 124 in FIG. 5A, each of the initial nodes has a distinct set of nodes that follow (i.e., there are no nodes that can be reached starting from two different initial nodes). In this case, each worker process 518 is associated with a unique media file type 402. In some implementations, however, some of the nodes can be reached from two or more initial nodes.

Node A 500-8 illustrates several aspects of the process flow graph 124. First, Node A uses two distinct partial schemas 502-5 and 502-6 created by the first initial node 500-1. One of these input partial schemas 502-5 is also used by another node in the process flow graph 124. Node A 500-8 also creates two distinct output schemas 502-7 and 502-8, which are used by two other nodes.

The second initial node 500-2 creates an output partial schema 502-1 that is used by both node B 500-4 and node C 500-5. Node B 500-4 uses the input partial schema 502-1 and creates an output partial schema 502-2, which is used by node E 500-7. Note that node B could create other partial schemas as well, such as inserting terms into the keyword partial schema.

Node C 500-5 uses one input schema 502-1, and creates an output schema 502-3, which is used by three other nodes, including node D 500-6 and node E 500-7. Node D uses a single input schema 502-3, and creates an output schema 502-4 that is used by node E 500-7.

As illustrated in FIG. 5A, node E 500-7 uses three distinct input schemas 502-2, 502-3, and 502-4. Node E 500-7 creates one or more output schemas, which are not shown.

Because the source partial schema 600 is always created before the traversal of the graph begins, it does not create any dependencies. Because of this, there are no arrows in the process flow graph corresponding to the source partial schema 600. For example, node D 500-6 could use the source partial schema 600 in addition to the partial schema 502-3 created by node C 500-5.

One example of a worker process is the ImageProcessor, which is responsible for producing the image schema 604 by reading the source image file and extracting the metadata stored in the file such as the Exif or IPTC data stored in JPEG files. Another example of a worker process is the FaceProcessor, which uses an image schema and generates a face schema, which can be used by other worker processes, such as facial recognition.

Implementations provide a configurable set of extensible processing algorithms that convert binary data into text. In this way, the media processing engine can be adapted to specific media file sets. In particular, users can create new worker processes and new partial schemas, and define which partial schemas each worker process creates or uses. In some implementations, the extensibility is provided as an SDK for developers.

Figure 5C:
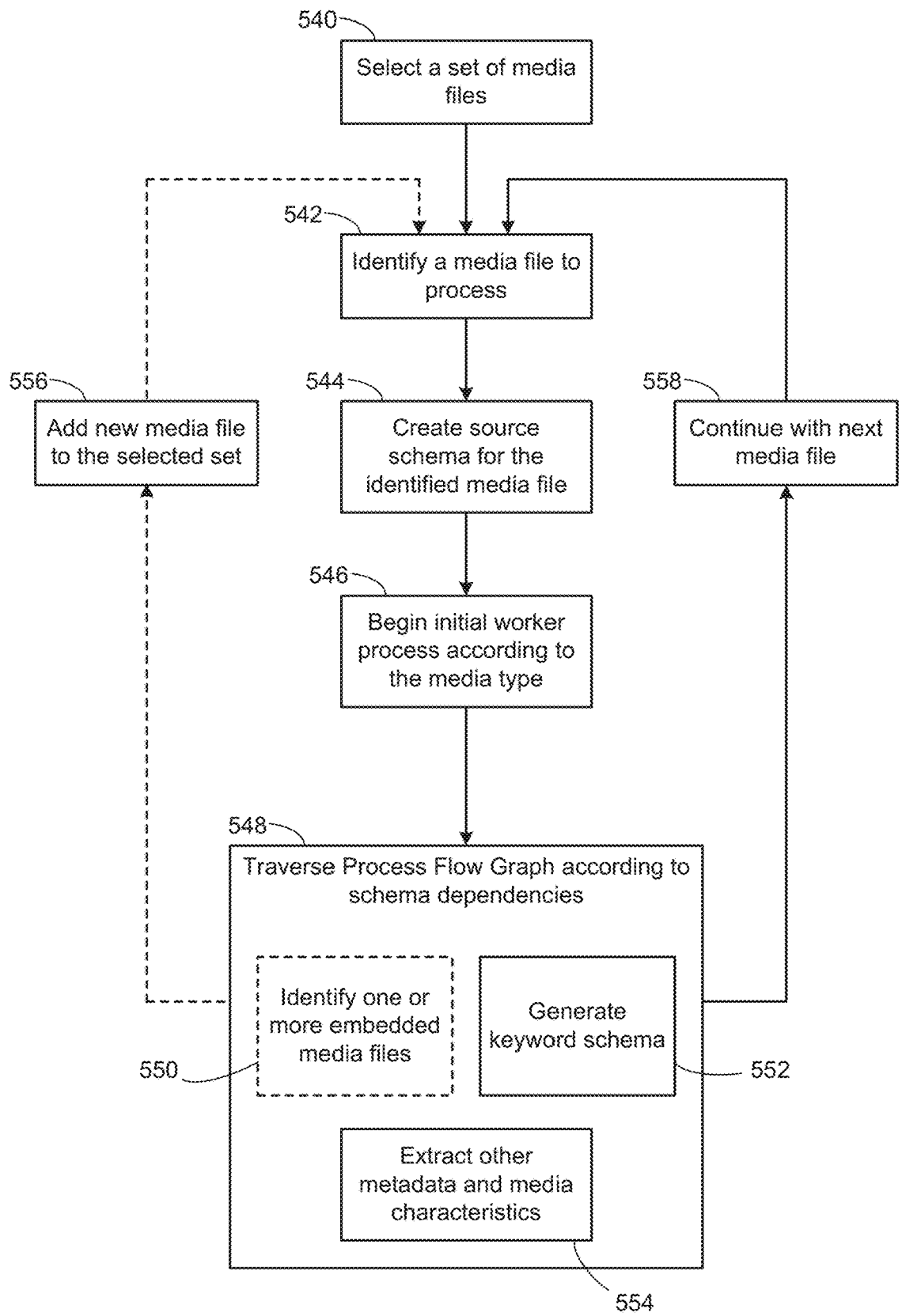
FIG. 5C provides a process flow for generating searchable content for media files, in accordance with some implementations.

FIG. 5C illustrates the process of generating searchable content for a set of media files. The process begins by selecting (540) a set of media files to process. In some instances, the files are selected for importation. In other instances, media files that are already imported are selected for reprocessing or validation.

From the selected set of files, a media file is identified (542) for processing. In some implementations, many separate worker threads are running, so many media files can be processed in parallel. The multiple threads may be on the same physical server, and/or on separate physical servers. Once a media file is identified, a source partial schema is created (544) for the identified media file. FIG. 6A illustrates an example source partial schema 600. Based on the media type of the identified media file, the appropriate initial worker process begins (546). For example, in FIG. 5A, one of the three initial nodes 500-1, 500-2, or 500-3 begins.

Once the initial worker process is complete, the rest of the process flow graph is traversed (548) according to the schema dependencies. When there are multiple worker threads available, two or more processing threads may be working on the same media file.

In some implementations, during the traversal (548), one or more of the worker processes identifies (550) media files that are embedded in the currently processing media file. For example, a worker process that is scanning a PDF file may identify one or more embedded images. As another example, when processing a video, some implementations select a sample of the video frames and treat the sampled frames as individual images. When embedded media files are identified, the new media files are added (556) to the selected set for processing.

A key aspect of the traversal (548) is to generate searchable content. One way that this is done is to determine keywords. The traversal generates (552) a keyword partial schema and inserts the determined keywords into this partial schema. Note that two or more distinct processes can insert keywords into the keyword partial schema. For example, one worker process could determine a keyword by performing OCR on a specific portion of an image, a second worker process could determine keywords that are the name of a person whose face was recognized, and a third worker process could identify a city name or other geographical location based on GPS coordinates associated with an image.

In some implementations, the traversal (548) extracts (554) other metadata and/or media characteristics as well, and saves the data in an appropriate partial schema. For example, some implementations do a color analysis of an image to determine a color palette.

When the traversal of the process flow graph 124 is complete, the media processing engine 132 continues (558) with the next media file.

In some implementations, the media processing also includes a "gather" stage. The gather stage can be used for a media file that was broken into smaller pieces (e.g., a PDF broken into individual pages). The gather phase is invoked after all the pieces (e.g., pages) have been processed (e.g., processed in parallel). The gather phase has access to all of the data computed by the child processing pipelines as well as the original parent media file. The gather phase can use this information in a number of ways. In some implementations, the gather phase moves data computed by the child processes into the parent. For example, if an image within a PDF document contains a specific type of graph, or a signature, the gather phase can store that information in the parent media file entry for subsequent searching (e.g., a subsequent search for PDF documents with a specific signature). In some implementations, a gather operation is performed for a specific parent media file as soon as all of its children (and grandchildren, etc.) are processed. In other implementations, there is a single gather phase that is executed after all of the processing of individual files (e.g., perform all of the gathering as a batch process).

Figure 5D:
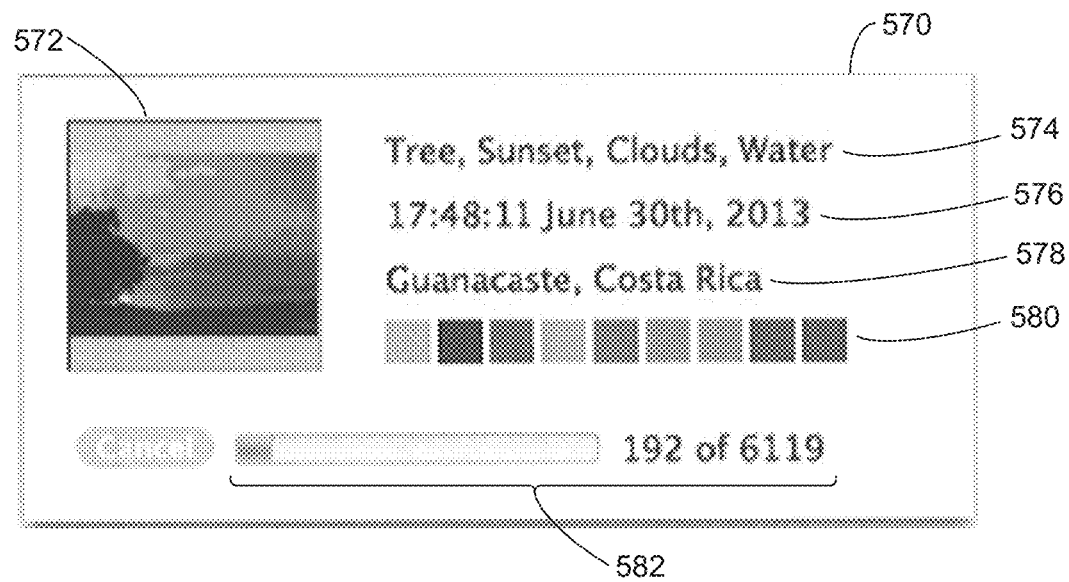
FIG. 5D is a user interface window displayed while importing media files into a media catalog, in accordance with some implementations.

FIG. 5D shows a pop up window 570 that is displayed during import according to some implementations. The window 570 includes a thumbnail image 572 of the media file being processed, as well as an indicator graphic 582 of import progress. In the implementation illustrated, the window provides additional information that has been determined about the media file. The window 570 includes a set of keywords 574 that have been determined for the media file, a date/time 576 when the media file was created, a name of the location 578 depicted in the media file (e.g., determined based on GPS coordinates), and a palette 580 of colors in the image.

FIGS. 6A-6G illustrate some of the common partial schemas used by the worker processes 134 while processing media files. FIG. 6A illustrates a source partial schema 600, which is filled in based on data directly available about the source media file. FIG. 6B illustrates a document partial schema 602, which is used for media files that are documents (e.g., a PDF or a word processing document). Note that this partial schema is recursive, because it can include references to embedded images and videos. In some implementations, keywords extracted for the embedded images and videos are added to the list of keywords for the document itself.

FIG. 6C illustrates a simple image partial schema 604, used for image files. In some implementations, there are sub-schemas that specify data for specific file formats, such as Exif or IPTC. Some implementations also include computed sub-schemas defined by the output of various processing algorithms. For example, a partial schema that includes a set of statistical properties is computed for image schemas (e.g., containing definitions of common properties, such as histograms or segmentations).

FIG. 6D illustrates a video partial schema 606 used to store information about video files. The video schema 606 is defined for every video file format. It contains values that are common to all video formats and optional sub-schemas that define other video-specific values. In some implementations, videos are converted to images during processing using the processRate option specified in the video schema. In some implementations, the default processRate is set either for the source Import or using global site defaults. The converted images are processed sequentially and the system compresses the results into time-based partial schemas that can be reconstructed for any specified time.

FIG. 6E illustrates a proxy partial schema 608, which is used to store lower resolution copies of a media file. It is common to have multiple proxies for a single media file (different resolutions), so proxy partial schemas are usually stored in a list (which is a container partial schema). The proxy container schema contains a list of proxy objects: alternative representations of the source file at lower resolutions or quality settings. The proxy list is often used during processing to improve the performance of complex analysis operations. For example, a worker process that runs facial detection or convolutional neural networks can generally run on a lower-resolution proxy of the original image or video source file.

FIG. 6F illustrates a location partial schema 610, which includes information about a location, typically converting from GPS coordinates to meaningful geographic information, such as city or country. In some implementations, the location partial schema includes more granular information, such as a district within a city or a street name. In some implementations, the location partial schema 610 includes a business name or a common name for the site (e.g., a stadium name).

FIG. 6G illustrates a note partial schema 612, which is a general purpose schema to store notes about a media file. The note partial schema 612 contains a list of string and drawing notations. In some implementations, each entry has an associated user, time, and permission. Drawings are stored using a series of 2D point, line, or polygon arrays.

In addition to the partial schemas illustrated in FIGS. 6A-6G, implementations typically use several other partial schemas as well. One of the additional partial schemas is the keyword partial schema. The keyword schema contains some fields that are used for media file searches. In some implementations, keywords are segmented by confidence, and a separate set of fields are used to store suggestion terms used during type-ahead instant search.

The link partial schema manages references between media files. A link stores a list of dependent media files and a parent media file. These fields are used by the processing fabric to re-submit work to the system for additional processing. For example, embedded images and videos are extracted from PDF documents as dependent links and frames from a video are extracted as image files for subsequent processing.

In the partial schema definitions shown in FIGS. 6A-6G, a data type of the form List < > indicates that there can be one or more instances of the field. A list has a specified order.

Implementations provide a standard set of core schemas, and this set of schemas can be extended in several ways. First, some implementations enable a user to add additional data fields to existing schemas. For example, a user could add an additional data field to the image partial schema 604 to specify whether each image is in color or black and white. The user specifying the additional fields also specifies the data types of the additional data fields.

Figure 6H:
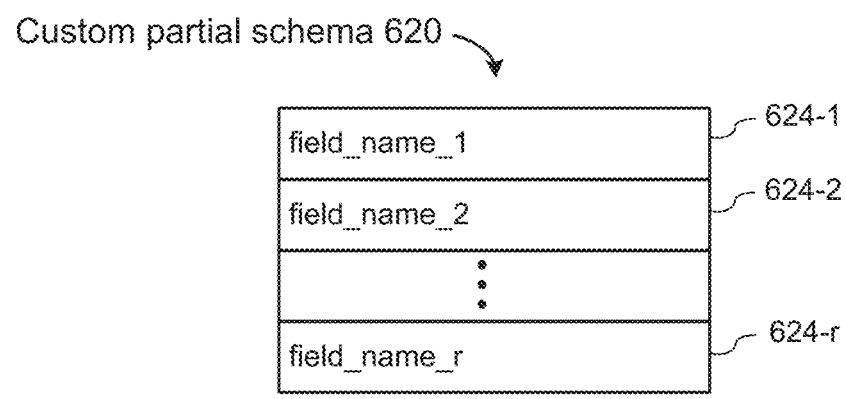
FIG. 6H illustrates a custom partial schema in accordance with some implementations.

A user can also create entirely new partial schemas, such as the custom partial schema 620 illustrated in FIG. 6H. A custom partial schema 620 typically defines a group of related data fields that are unique to a specific application. For example, for a collection of images for major league baseball, each of the images could be assigned one or more team names, one or more player names, one or more corporate names whose logos are captured in the images, and so on. This information can be stored in the data fields of a custom schema. Each data field in a custom schema has a specified data type, and may store a single value or a list of values (which may be ordered or unordered). In general, the number of custom fields in a custom schema is not limited. In the illustrated implementation, a user has defined a set of r field names field_name_1 624-1, field_name_2 624-2, . . . , field_name_r 624-r. In some implementations, all of the media files within one collection share the same set of schemas, including the custom schemas. In some of these implementations, only the schemas that have corresponding data are stored. In some implementations, various subcollections of media files share a same set of schemas, and the sets of schemas can be customized according to each subcollection (e.g., some subcollections add additional data fields to some of the core schemas and add some additional partial schemas).

Figure 7:
FIG. 7 provides a screen shot of a media application in accordance with some implementations.

FIG. 7 is a screen shot of a user interface 224 for a media application 112. In this screen shot, the user has entered the term "lakeshore" into the search window 702, and the application 112 has retrieved a set of search results 704, which are thumbnail images of media files that match the term "lakeshore." The media files corresponding to the search results 704 were processed by the media processing engine 132 to extract keywords. The extracted keywords may include the term "lakeshore" literally, or the query engine 330 may match the search term "lakeshore" to other similar keywords, such as "lake."

Implementations can handle a wide range of media file formats, including images, videos, and container documents that have embedded media. Worker processes have access to the full source document, and are free to process the native data. For example, a worker process can access the full video source, perform processing that requires access to all of the frames within a video and the native metadata stored with the video file. Similarly, a worker process for multipage documents (e.g., PDF files) can examine the full text of the file and generate summary keywords or information that improves search and navigation. In some implementations, a multipage document is broken apart into separate pages, and each page is processed by a separate worker process to identify summary keywords (and potentially extract embedded images and/or video for separate processing.). When all of the individual pages have been processed, a "gather" worker process combines the results to create a list of search terms for the parent document. Running multiple worker processes in parallel can dramatically improve performance, both because of the multiple threads and because searching individual pages is faster than searching an entire document.

As indicated in FIG. 5C, worker processes can submit additional media files to be processed by the system. This provides a way to break up computations into smaller chunks or convert between media formats. The worker process for PDF files, for example, can submit the images and videos embedded in the document for processing. After the top-level PDF file finishes, the system submits any new derived files back to the processing pipeline.

Some implementations break down large tasks to improve load balancing. A video slice worker process can break up videos into individual images or into smaller segments (e.g., chunks of a fixed small number of frames or chunks that align with shots). Some implementations use a worker process that extracts every Nth frame and submits it as a dependent image. Some implementations just choose a sample frame for processing. Providing this control in the user-configurable worker processes enables optimized processing.

In some cases, the results of dependent processing can benefit from collation to optimize their storage. For example, after processing every Nth frame in a video file, it can be useful to compress their schemas, which are largely duplicated but have minor differences. It may be useful to store the schemas computed by analyzing a limited number of individual frames (e.g., every Nth frame), but then do facial processing on every frame. The number of faces for each range of frames can be stored as metadata for the video. Collation is performed after all of the derived media files (e.g., processing of individual video frames as images) have completed processing. A database search can be used to find all of the derived media files and compress their results.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of generating searchable content for visual media files, comprising:
    at a computing system having one or more processors and memory:
        defining a set of schemas, wherein each schema includes a respective plurality of data fields, each having a respective name and data type, and the set of schemas includes a source schema and a keyword schema;
        defining a plurality of worker processes, wherein each worker process definition specifies a respective set of one or more input schemas from the defined set of schemas and each worker process definition specifies a respective set of one or more output schemas from the defined set of schemas;
        building a dependency graph that includes a node for each worker process, with dependencies based on the input schemas and output schemas for each worker process, wherein the dependency graph includes a plurality of initial worker processes, each initial worker process corresponds to a distinct media type, and the respective set of input schemas for each initial worker process consists of the source schema;
        receiving selection of a plurality of visual media files;
        constructing a respective source schema instance for each of the selected visual media files, filling in fields in the source schema instance using information about the respective visual media file;
        for each selected visual media file:
            traversing nodes in the dependency graph beginning with a respective initial worker process corresponding to a media type of the visual media file, thereby executing a plurality of worker processes, which construct a plurality of additional distinct schema instances, wherein one or more of the worker processes executed during the traversal inserts search terms into a respective keyword schema instance; and
            storing data from the keyword schema instance and a link to the corresponding visual media file in a database for subsequent searching of visual media files.

2. The method of claim 1, further comprising:
    receiving a search query from a user, wherein the search query comprises a plurality of textual terms;
    matching the received search query to one or more keyword schema instances; and
    returning, to the user, search results that identify visual media files corresponding to the matched keyword schema instances.

3. The method of claim 1, further comprising storing, in the database, data for a plurality of the additional schema instances.

4. The method of claim 3, further comprising:
    receiving a search query from a user, wherein the search query comprises a plurality of textual terms;

matching the received search query to one or more of the stored schema instances; and returning, to the user, search results that identify visual media files corresponding to the matched schema instances.

5. The method of claim 1, wherein traversing nodes in the dependency graph for a first visual media file includes executing a first worker process that extracts one or more additional visual media files from within the first visual media file and adds the additional visual media files to the selected visual media files.

6. The method of claim 1, wherein the selected visual media files include one or more image files.

7. The method of claim 1, wherein the selected visual media files include one or more video files.

8. The method of claim 1, wherein the selected visual media files include one or more multipage documents.

9. A computer system, comprising:
one or more processors;
memory; and
one or more programs stored in the memory and configured for execution by the one or more processors, the one or more programs comprising instructions for:
defining a set of schemas, wherein each schema includes a respective plurality of data fields, each having a respective name and data type, and the set of schemas includes a source schema and a keyword schema
defining a plurality of worker processes, wherein each worker process definition specifies a respective set of one or more input schemas from the defined set of schemas and each worker process definition specifies a respective set of one or more output schemas from the defined set of schemas;
building a dependency graph that includes a node for each worker process, with dependencies based on the input schemas and output schemas for each worker process, wherein the dependency graph includes a plurality of initial worker processes, each initial worker process corresponds to a distinct media type, and the respective set of input schemas for each initial worker process consists of the source schema;
receiving selection of a plurality of visual media files;
constructing a respective source schema instance for each of the selected visual media files, filling in fields in the source schema instance using information about the respective visual media file;
for each selected visual media file:
traversing nodes in the dependency graph beginning with a respective initial worker process corresponding to a media type of the visual media file, thereby executing a plurality of worker processes, which construct a plurality of additional distinct schema instances, wherein one or more of the worker processes executed during the traversal inserts search terms into a respective keyword schema instance; and
storing data from the keyword schema instance and a link to the corresponding visual media file in a database for subsequent searching of visual media files.

10. The computer system of claim 9, wherein the one or more programs further comprise instructions for:
receiving a search query from a user, wherein the search query comprises a plurality of textual terms;
matching the received search query to one or more keyword schema instances; and
returning, to the user, search results that identify visual media files corresponding to the matched keyword schema instances.

11. The computer system of claim 9, wherein the one or more programs further comprise instructions for storing, in the database, data for a plurality of the additional schema instances.

12. The computer system of claim 11, wherein the one or more programs further comprise instructions for:
receiving a search query from a user, wherein the search query comprises a plurality of textual terms;
matching the received search query to one or more of the stored schema instances; and
returning, to the user, search results that identify visual media files corresponding to the matched schema instances.

13. The computer system of claim 9, wherein traversing nodes in the dependency graph for a first visual media file includes executing a first worker process that extracts one or more additional visual media files from within the first visual media file and adds the additional visual media files to the selected visual media files.

14. The computer system of claim 9, wherein the selected visual media files include one or more image files.

15. The computer system of claim 9, wherein the selected visual media files include one or more video files.

16. A non-transitory computer readable storage medium storing one or more programs configured for execution by one or more processors of a computer system, the one or more programs comprising instructions for:
defining a set of schemas, wherein each schema includes a respective plurality of data fields, each having a respective name and data type, and the set of schemas includes a source schema and a keyword schema;
defining a plurality of worker processes, wherein each worker process definition specifies a respective set of one or more input schemas from the defined set of schemas and each worker process definition specifies a respective set of one or more output schemas from the defined set of schemas;
building a dependency graph that includes a node for each worker process, with dependencies based on the input schemas and output schemas for each worker process, wherein the dependency graph includes a plurality of initial worker processes, each initial worker process corresponds to a distinct media type, and the respective set of input schemas for each initial worker process consists of the source schema;
receiving selection of a plurality of visual media files;
constructing a respective source schema instance for each of the selected visual media files, filling in fields in the source schema instance using information about the respective visual media file;
for each selected visual media file:
traversing nodes in the dependency graph beginning with a respective initial worker process corresponding to a media type of the visual media file, thereby executing a plurality of worker processes, which construct a plurality of additional distinct schema instances, wherein one or more of the worker processes executed during the traversal inserts search terms into a respective keyword schema instance; and
storing data from the keyword schema instance and a link to the corresponding visual media file in a database for subsequent searching of visual media files.

17. The computer readable storage medium of claim 16, wherein the one or more programs further comprise instructions for:
- receiving a search query from a user, wherein the search query comprises a plurality of textual terms;
- matching the received search query to one or more keyword schema instances; and
- returning, to the user, search results that identify visual media files corresponding to the matched keyword schema instances.

18. The computer readable storage medium of claim 16, wherein the one or more programs further comprise instructions for storing, in the database, data for a plurality of the additional schema instances.

19. The computer readable storage medium of claim 18, wherein the one or more programs further comprise instructions for:
- receiving a search query from a user, wherein the search query comprises a plurality of textual terms;
- matching the received search query to one or more of the stored schema instances; and
- returning, to the user, search results that identify visual media files corresponding to the matched schema instances.

20. The computer readable storage medium of claim 16, wherein traversing nodes in the dependency graph for a first visual media file includes executing a first worker process that extracts one or more additional visual media files from within the first visual media file and adds the additional visual media files to the selected visual media files.

* * * * *